United States Patent
Cheng et al.

(10) Patent No.: US 10,007,749 B2
(45) Date of Patent: Jun. 26, 2018

(54) CONVERGED ADAPTIVE COMPENSATION SCHEME

(71) Applicant: Intel Corporation, Santa Clara, CA (US)

(72) Inventors: Roger K. Cheng, Campbell, CA (US);
Stefan Rusu, Santa Clara, CA (US);
Aaron Martin, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 14/494,190

(22) Filed: Sep. 23, 2014

(65) Prior Publication Data

US 2016/0087918 A1 Mar. 24, 2016

(51) Int. Cl.
*G06F 17/50* (2006.01)
*H03M 1/12* (2006.01)
*H03M 1/66* (2006.01)

(52) U.S. Cl.
CPC ...... *G06F 17/5063* (2013.01); *G06F 2217/78* (2013.01); *H03M 1/12* (2013.01); *H03M 1/66* (2013.01)

(58) Field of Classification Search
CPC .. H04L 12/5689; G06F 17/5063; H03M 1/12; H03M 1/66
See application file for complete search history.

(56) References Cited

U.S. PATENT DOCUMENTS

| | | | |
|---|---|---|---|
| 6,584,098 B1 * | 6/2003 | Dutnall | H04L 12/5692 370/354 |
| 2007/0282944 A1 | 12/2007 | Odaka et al. | |
| 2008/0259919 A1 | 10/2008 | Monga | |
| 2009/0058663 A1 | 3/2009 | Joshi et al. | |
| 2010/0194434 A1 * | 8/2010 | Tran Vo | H03K 5/135 326/93 |

(Continued)

FOREIGN PATENT DOCUMENTS

| | | |
|---|---|---|
| TW | 201415936 | 4/2014 |
| WO | 2014037779 | 3/2014 |
| WO | 2014114344 A1 | 7/2014 |

OTHER PUBLICATIONS

International Search Report and Written Opinion for International Patent Application No. PCT/US2015/046227, dated Dec. 28, 2015, 12 pages.

(Continued)

*Primary Examiner* — Hoon J Chung
(74) *Attorney, Agent, or Firm* — Green, Howard & Mughal LLP

(57) ABSTRACT

Described is an apparatus which comprises: logic to convert output of at least one sensor to a digital sensing signal; a router coupled to the sensor, the router to receive the digital sensing signal and to map into circuit data; and one or more communication interfaces, coupled to the router, to forward circuit data to a circuit endpoint. Described is a method which comprises: providing one or more digital sensing signals from a plurality of sensors; receiving the one or more digital sensing signals; generating packets of data using the one or more digital sensing signals; and providing the packets of data to one or more destinations.

27 Claims, 8 Drawing Sheets

(56) References Cited

U.S. PATENT DOCUMENTS

| | | | |
|---|---|---|---|
| 2012/0034713 A1* | 2/2012 | Lee | H03F 1/30 |
| | | | 438/5 |
| 2013/0007413 A1* | 1/2013 | Thomson | G06F 1/324 |
| | | | 712/30 |
| 2013/0197320 A1* | 8/2013 | Albert | A61B 5/02055 |
| | | | 600/301 |
| 2014/0052832 A1 | 2/2014 | Dina et al. | |
| 2014/0266290 A1* | 9/2014 | Odedara | G01R 31/2884 |
| | | | 324/762.01 |

OTHER PUBLICATIONS

Office Action and Search Report for Taiwan Patent Application No. 104127371 dated Sep. 7, 2016, 8 pages.
Notice of Allowance for Taiwan Patent Application No. 104127371 dated Dec. 13, 2016, 3 pages.
International Preliminary Report on Patentability for PCT/US15/46227 dated Apr. 6, 2017, 9 pages.

* cited by examiner

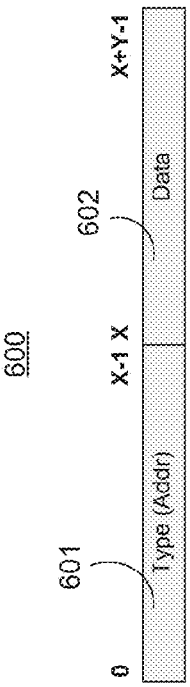
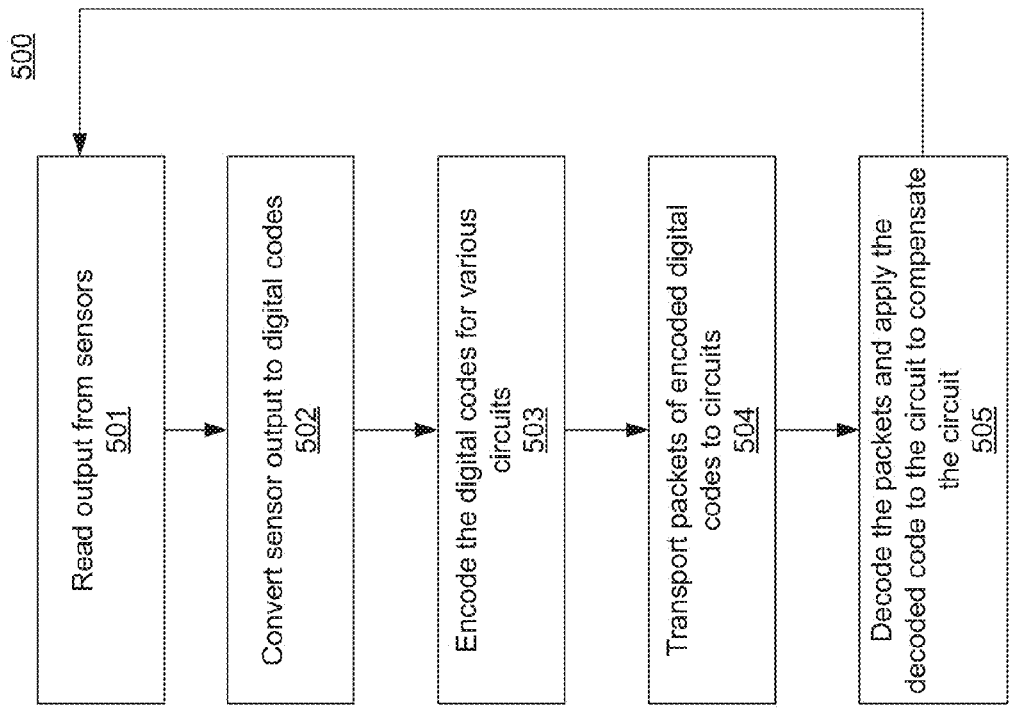

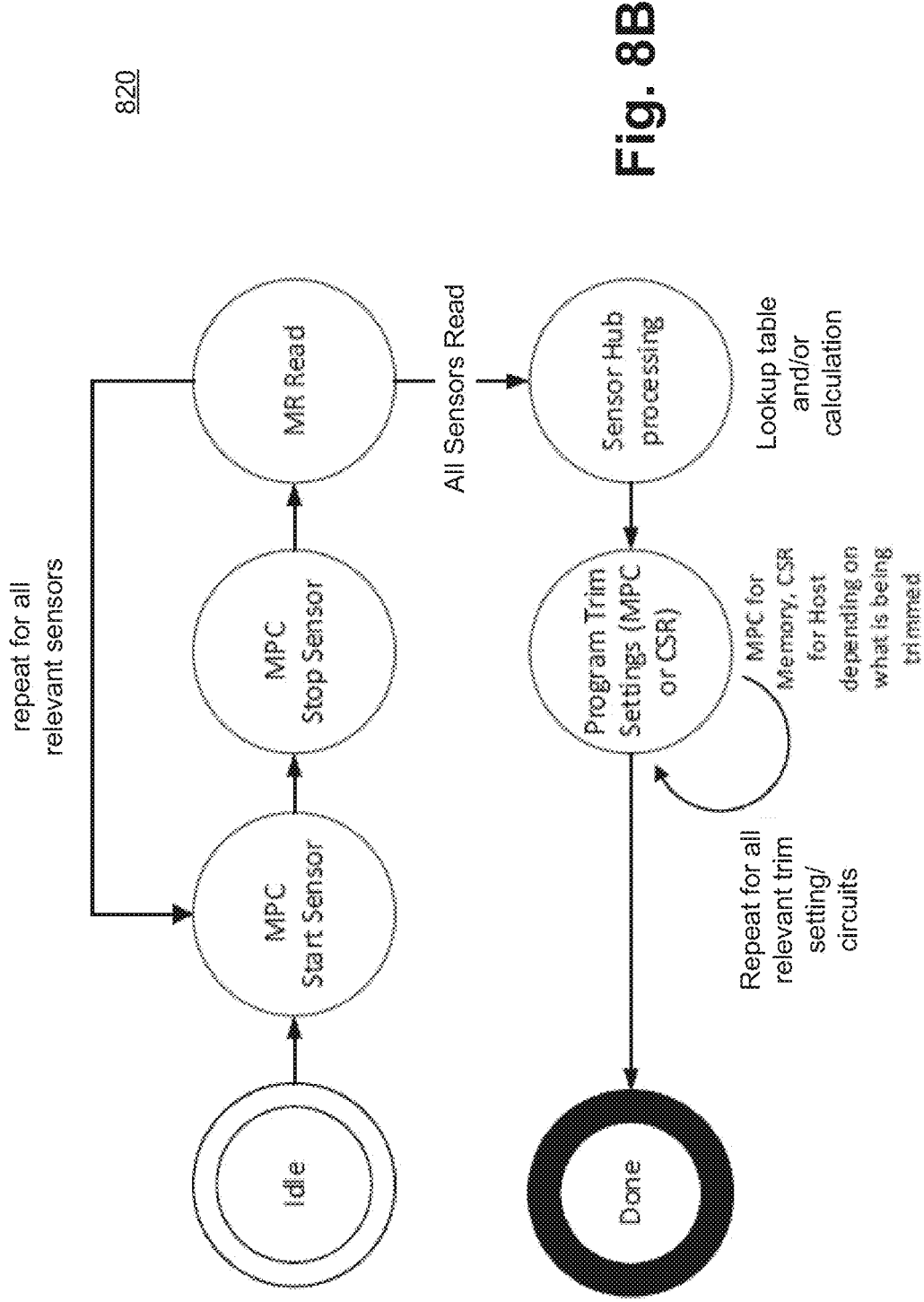

CONVERGED ADAPTIVE COMPENSATION SCHEME

BACKGROUND

Power consumption is an ever increasing concern in analog circuit design. As the transistor size shrinks, it is increasingly difficult to reduce power at the same scale. Standard methods of designing power efficient circuits are becoming limited and new methods of extending power savings of analog circuits must be used to further scale power supply and consumption with process scaling.

In general, analog circuits are optimized to support all process, voltage, and temperature (PVT) conditions and operating configurations. Examples of operating configurations include but are not limited to frequency, impedance ranges, reference voltage range, temperature ranges, and bias ranges. Configuration registers, fuses, and compensation circuits are used to narrow the operating focus of the analog circuit, however, these mechanisms for compensation are limited.

Compensation circuits are often redundant, complex, and consume large amounts of area. Compensation circuits such as resistance compensation use a replica circuit and a sensing mechanism to create feedback that is used by a Finite State Machine (FSM) to trim the analog circuit. These and similar specialized compensation circuits for fixed functions are typically instantiated in multiple places for multiple circuits and are redundant. Additionally, the FSMs are often complex and are difficult to validate because of their mixed signal nature.

Fusing is a relatively simple way of trimming an analog circuit by providing fixed process skew data to the analog circuit. The fuses are determined at the factory during High Volume Manufacturing (HVM). While fusing is an effective and simple way to improve analog circuit operating focus, it lacks the information regarding the temperature and voltage sensitivity over time. Voltage and temperature are important parameters in circuit performance, so there is a lot of critical trimming data that is missed through this method alone.

Configuration registers are also used to trim analog circuits. Configuration registers are static in nature, so they also suffer from lack of real time voltage and temperature feedback. Using traditional circuit trimming techniques for analog circuits result in a higher power and more complex design to cover a wide range of PVT conditions and operating configurations.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 5 illustrates a flowchart of a method for compensating circuits using the converged compensation scheme, according to some embodiments.

FIG. 6 illustrates a packet sent over a bus for compensating circuits using the converged compensation scheme, according to some embodiments.

FIG. 8B illustrates a state machine of a calibration cycle initiated by a host for targeting memory devices, according to some embodiments of the disclosure.

DETAILED DESCRIPTION

Figure 1:
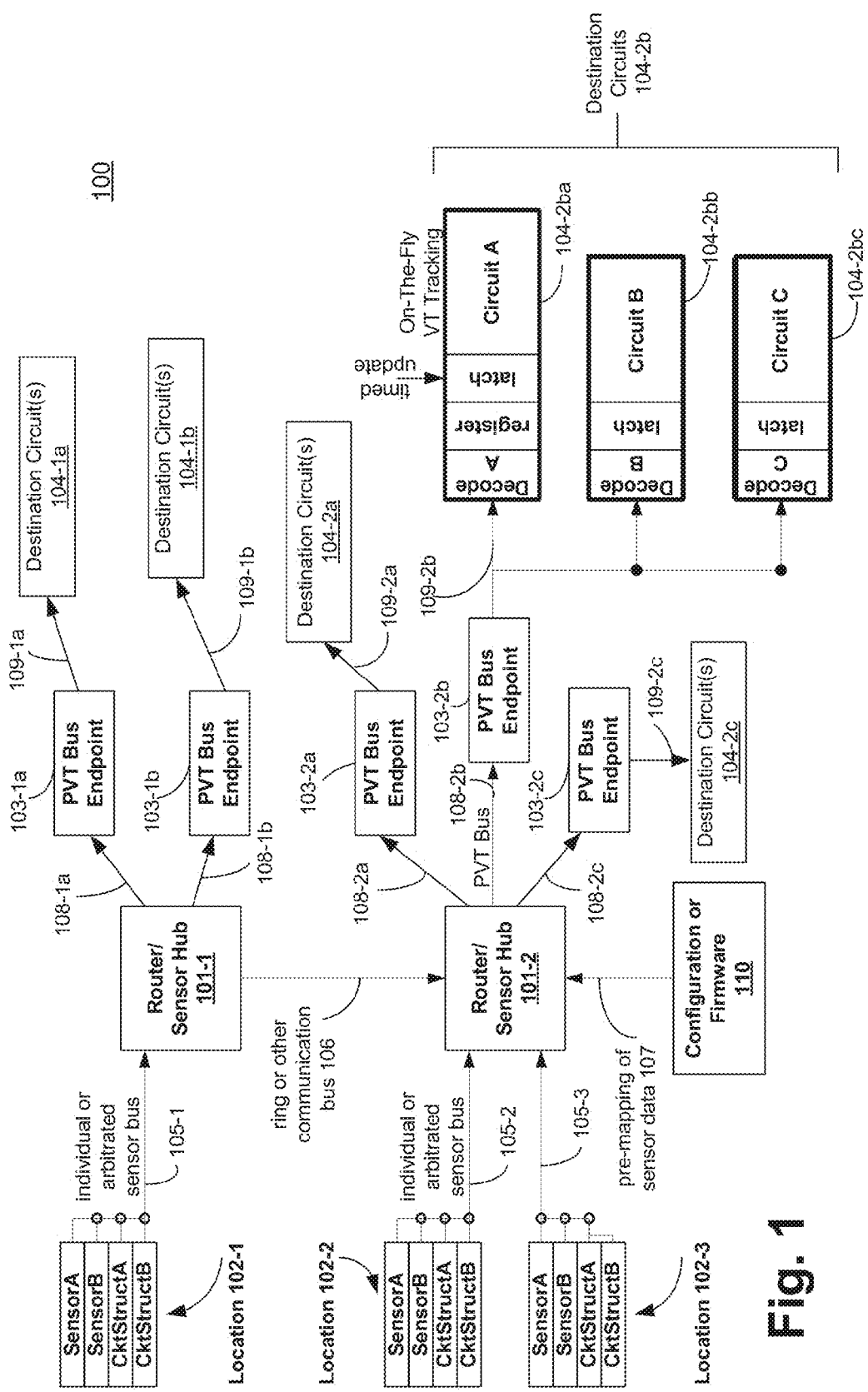
FIG. 1 illustrates a converged compensation scheme with distributed routers, according to some embodiments of the disclosure.

Some embodiments describe a converged adaptive compensation scheme. In some embodiments, an apparatus (and corresponding method) is provided to reduce power consumption and complexity/area (while maintaining performance) by trimming the circuits in real time by using sensor data with circuit specific decoding. In some embodiments, this real time data can be distributed by a router (e.g., implemented as hardware) that has access to the various sensors to measure process, voltage(s), and temperature (i.e., PVT conditions). In some embodiments, the sensors may include circuit structures that can generate information to be used across multiple different circuit types.

In some embodiments, there may be many sensors in various locations of the die to support location specific sensing to compensate for within-die variations. In some embodiments, the router can process the available sensor data and send the result through a configuration bus. In some embodiments, the result is packaged as a PVT data packet that contains information tailored to types of devices and circuits. In some embodiments, the analog circuits at the configuration bus endpoint can use the PVT data packet to trim their mode of operation. In some embodiments, the configuration bus can periodically send out PVT data updates to continuously keep the analog circuits in their optimal power/performance operating point.

In some embodiments, the analog circuit can be designed to operate in a specific PVT corner as indicated by the PVT trim data. In such embodiments, the analog circuit does not need to be designed to operate across PVT corners with static configuration settings because the analog circuit can be designed for ideal characteristics assuming the availability of accurate trim settings.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors used in various circuits, logic, and functional blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a converged compensation scheme 100 with distributed routers, according to some embodiments of the disclosure. In some embodiments, converged compensation scheme 100 comprises one or more routers (e.g., Router/Sensor Hub 101-1, 101-2, etc.); a plurality of sensors and circuit structures in various locations of the die(s) such as locations Location 102-1, Location 102-2, Location 102-3, etc.; one or more PVT bus Endpoints (e.g., 103-1*a*, 103-1*b*, 103-2*a*, 103-2*b*, 103-2*c*, etc.); one or more Destination Circuits (e.g., 104-1*a*, 104-1*b*, 104-2*a*, 104-2*b*, 104-2*c*, etc.); individual or arbitrated sensor buses (e.g., 105-1, 105-2, 105-3, etc.); ring or other communication buses (e.g., bus 106); bus for pre-mapping sensor data 107; one or more one or more configuration busses (e.g., PVT Busses 108-1*a*, 108-1*b*, 108-2*a*, 108-2*b*, 108-2*c*, 109-2*a*, 109-2*b*, 109-2*c*, etc.); and Configuration logic or Firmware 110.

In some embodiments, sensors (e.g., SensorA and SensorB) can be any type of circuit that can generate codes that change based on PVT. In some embodiments, the sensors can be one of a few main types of circuits including circuits that measure PVT directly. For example, voltage sensors, current sensors, temperature sensors, and composite process measuring structures.

Composite process measuring structures are structures that indicate whether the die where the circuit structure is formed exhibits fast, slow, typical, etc. process properties for given power supply and temperature levels. Composite process measuring structures can be simple structures such as ring oscillators or complex structures such as a compensation circuit that generates a digital code indicating a desired parameter value (such as termination resistance) for a transceiver.

In case of a ring oscillator, its oscillation frequency is proportional to the process properties (e.g., higher oscillation frequency for fast process and slower oscillation frequency for slow process for a given power supply level and temperature). In some embodiments, the sensors include test structures (e.g., CktStructA, CktStructB, etc.,) that measure circuit performance based on specific devices arranged in a specific topology (e.g., passive resistor with transistor a switch).

In some embodiments, sensors are any test structures that can assist in the trimming of analog circuits. The term "trimming" here generally refers to modulating or compensating one or more parameters of a circuit. For example, termination impedance of a transmitter can be trimmed to achieve a desired level (e.g., 50 Ohms) by adding or subtracting resistances to or from a variable sized resistor (that may be implemented using transistors). In some embodiments, sensors that can measure generalized data for use in many types of analog circuits may be more suitable for this scheme. However, even very specific test structures can be used as necessary. Examples of specific test structures are replica circuits, thick-gate and thin-gate transistor based ring oscillators, etc.

In some embodiments, the sensors are located in different parts of the dies according to their relevance to the Destination Circuits. For example, if the Destination Circuit (e.g., 104-2*ba*) is a thermometer that needs to be trimmed, then the thermal sensor (e.g., SensorA of Location 102-1) may be located in close proximity to the thermometer. In some embodiments, the analog portion of the thermal sensor is part of the Destination Circuit (e.g., 104-1*a*) while the diodes of the thermal sensor are part of the sensors. In such embodiments, the diodes may be located in close proximity to the analog portion of the thermal sensor.

In many instances, the sensor data is analog in nature. Sending the analog data over to the Router/Sensor Hub may interfere with the accuracy of the analog data. In some embodiments, sensor data is converted into digital data, for example, by analog to digital converters (ADCs), and that digital data is then routed over short or long distances via the individual or arbitrated sensor bus (e.g., 105-2) to the Router/Sensor Hub (e.g., 101-2). In some embodiments, the ADCs are part of the sensor block (having sensors and/or circuit structures).

In some embodiments, the Router/Sensor Hub (e.g., 101-2) encodes the digital data received over the individual or arbitrated sensor bus (e.g., 105-2) into a format that can be consumed efficiently by the Destination Circuit (e.g., 104-2ba). In some embodiments, the sensor may provide more data and granularity than is required in order to trim the analog circuit. To address these cases, the Router/Sensor Hub (e.g., 101-2) comprises a PVT data encoder (not shown) that processes the sensor data into a format that is easily consumable by a variety of circuits. The encoder may use any kind of encoding scheme to encode the sensor data.

One example of the encoder usage is to provide IDV (In-die variation) data to be consumed by a circuit requiring three settings to span the entire PVT range of operation. In some embodiments, an IDV circuit may be implemented as a ring oscillator. These three settings may be slow, typical, and fast PVT process technology corners of a process technology node (e.g., a 14 nm Complementary MOS (CMOS) process technology node). A person skilled in the art would know that a process corner is an example of a design-of-experiments (DoE) technique that refers to a variation of fabrication parameters used in applying an integrated circuit design to a semiconductor wafer. Process corners are generally categorized as slow, typical, and fast (but are not limited to these three) and represent the extremes of these parameter variations within which a circuit that has been etched onto the wafer must function correctly.

Referring back to the IDV example, the IDV count may be a number that is two bits wide. In order for the analog Destination Circuit to use the IDV count efficiently, the encoder of Router/Sensor Hub (e.g., 101-2) reduces the range of IDV values to a smaller number of settings to be consumed. In some embodiments, the encoder encodes by bit shifting of the digital data by a predefined count (e.g., by counts of two, three, etc.) or by a programmable count. In some embodiments, the number of bits shifted depends on what is required by the downstream analog Distribution Circuit.

Many schemes can be employed to encode the sensor data. In some embodiments, other variations of the PVT data encoder may provide the ability to combine data from multiple sensors to be encoded as a different data type. For example, sensor data from an on-die resistor type and a transistor type may be combined to form a compensation code indicating the number of legs that need to be enabled to obtain a specific resistance from a linear driver of the same resistor and transistor type. In another example, sensor data from a p-type transistor and an n-type transistor may be combined to form a rise/fall delay mismatch compensation code from a CMOS driver of the same device types. In some embodiments, the encoder of Router/Sensor Hub (e.g., 101-2) may be fixed or configurable based on the settings provided by Configuration Logic or Firmware 110 (e.g., operating system). In some embodiments, the configurable encoder of Router/Sensor Hub (e.g., 101-2) allows for post-silicon feedback of silicon-to-simulation miscorrelation to be included in the decoding definition.

In some embodiments, Configuration Logic or Firmware 110 is used to program the configurable encoder of the router to specify how the sensor data types should be encoded. In some embodiments, the analog trimming controls may come from software derived compensation of similar circuits. In some embodiments, encoding information in firmware may also configure the encoder of the router based on circuit characterization from electrical validation and operating settings, which may include frequency, voltage, reference voltage ranges, etc.

In some embodiments, Router and Sensor Hub (e.g., 101-1 and 101-2) are used in the adaptive PVT compensation scheme to distribute the PVT and/or sensor data to either other routers (e.g., 101-1 distributing to 101-2) or to the Distribution Circuit where the data will be consumed. In some embodiments, the converged adaptive compensation scheme has a single router coupled to multiple PVT Bus Endpoints. For example, a single Router/Sensor Hub 101-2 is coupled to multiple PVT Bus Endpoints 103-2a, 103-2b, and 103-2c via PVT Bus 108-2a, 108-2b, and 103-2c, respectively.

In some embodiments, the multiple routers (e.g., 101-1 and 101-2) may exist in the adaptive PVT compensation scheme 100. In some embodiments, each router may couple to a sub-set of the total available sensor types. For example, Router Sensor Hub 101-2 is coupled to two sub-sets of sensor types via buses 105-2 and 105-3—one subset of sensors at Location 102-2 and another subset of sensors at Location 102-3. In some embodiments, routers forward the PVT data to other routers. For example, Router/Sensor Hub 101-1 transfers PVT data over bus 105 to Router/Sensor Hub 101-2 of the same or different die. It should be noted that the router may be an ideal place to observe sensor data due to both its direct connection to the sensors and the capability of communicating externally as a messaging agent.

In some embodiments, interconnect 108-* (i.e., between router and PVT Bus Endpoints) complies with a particular messaging protocol. Here, '*' indicates all variations associated with the precedent text. For example, 108-* refers to 108-1a, 108-2a, etc. In some embodiments, the messaging protocol is a proprietary protocol. For example, On-Chip System Fabric (IOSF) by Intel® Corporation, Advanced Microcontroller Bus Architecture (AMBA) interconnect platform by ARMO, CoreConnect by IBM®, etc. In some embodiments, the messaging protocol is an exiting messaging protocol such as Intel® Sideband Protocol Rev. 1.10 of Jul. 9, 2009 published at http://www.intel.com/content/dam/doc/application-note/sideband-technology-appl-note.pdf.

In some embodiments, the PVT bus (i.e., interconnect 108-*), however implemented, has the responsibility of transporting PVT data to the circuit endpoints 103-*. In some embodiments, PVT Bus Endpoint 103-* is removed and the PVT Bus 108-* directly communicates with the Destination Circuits 104-*. In some embodiments, Router/Sensor Hub 102-* periodically broadcasts the various types of PVT data packets to the PVT Bus Endpoints 103-* or to the Destination Circuits 104-*.

In some embodiments, PVT Bus Endpoints 103-* are configured to listen to the PVT Bus 108-* for the appropriate packets it requires for its Destination Circuits 104-*. In some embodiments, all Destination Circuits 104-* are registered with their local router so that the router knows which PVT data packets to direct to the various downstream Destination Circuits. In such embodiments, the router would address the PVT data packet to a specific destination. In some embodiments, Destination Circuits 104-* include logic to request a particular PVT data packet from the router.

For example, a Destination Circuit that needs voltage sensor data may request the routers to send that data to it. In some embodiments, the routers know the locations of the sensors relative to the requesting Destination Circuits and provide sensor data from the sensors in close proximity to the Destination Circuits rather than form sensors that are farther away. In some embodiments, the routers do not have pre-determined information on which Destination Circuits they send specific type of PVT data packets. In such embodiments, the routers respond to the PVT data request from the PVT Bus Endpoints and/or from the Destination Circuits.

In some embodiments, PVT Bus Endpoints 103-* are organized by types of Destination Circuits. For example, PVT Bus Endpoint 103-2b provides PVT sensor data from SensorA, SensorB, and SensorC (not shown) over interconnect 109-2b to Destination Circuits 104-2* (i.e., to 104-2ba, 1042bb, and 104-2bc, respectively). In another example, PVT Bus Endpoint 103-2b provides PVT data to Destination Circuits (here, various I/Os) according to the types of I/Os (e.g., I/O for Double Data Rate (DDR) interface as defined by the Joint Electron Device Engineering Council (JEDEC), I/O for MIPI® (Mobile Interface Processor Interface) compliant interface, etc.).

In some embodiments, Destination Circuit 104-* includes logic to decode the encoded sensor data provided by PVT Bus Endpoint 103-* and/or Router/Sensor Hub 101-*. For example, Destination Circuit 104-2ba comprises a decoder (Decode A) to decode data originating from SensorA; register to store the decoded output; latch to save data at predetermined times (e.g., periodically, once at boot time, every time the processor enters or exists a sleep mode, etc.); and Circuit A which is the circuit being compensated for one or more parameters (e.g., voltage, process, current, temperature, etc.). Unlike known methods and schemes for compensating parameters of circuits, here the Destination Circuit(s) can be compensated in real-time. Some embodiments that are compatible may use dynamic update schemes depending on the application. For example, to compensate free running clock drivers, it may be recommended to synchronously update the latches storing the configuration/PVT settings as to not induce a glitch on the driver outputs.

In this example, Destination Circuits 104-2bb and 104-2bc have similar architecture as Destination Circuit 104-2ba except that the register is removed. In such embodiments, the decoded data is latched and provided in real time to respective circuits. For example, data decoded by Decode B of Destination Circuit 104-2bb is latched as soon as it is decoded, and then provided to Circuit B; and data decoded by Decode C of Destination Circuit 104-2bc is latched as soon as it is decoded, and then provided to Circuit C. In some embodiments, the PVT data feedback and decode/mapping happens in real-time to support optimization for voltage and temperature changes.

In some embodiments, every Destination Circuit Endpoint (i.e., 103-*) is able to communicate with the corresponding router to receive the appropriate PVT data packet and decodes the data packet into a value that is meaningful to the Destination Circuit. In some embodiments, the PVT data on PVT Bus 108-* is generalized to work across many Destination Circuits. In some embodiments, each circuit type of the Destination Circuit may have its own unique decoder.

In some embodiments, implementation of the decoder in the Destination Circuits can vary in many ways and may depend on the type of PVT data packet that is used and the requirements of the Destination Circuit. In some embodiments, PVT data packet or its subset is directly latched and used by the circuit. In some embodiments, the decoder is programmable with the process and voltage value serving as an index to a look up table. One example of the PVT data packet is described with reference to FIG. 6.

FIG. 6 illustrates a packet 600 sent over the PVT Bus 108-2* for compensating circuits using the converged compensation scheme, according to some embodiments. In some embodiments, packet 600 comprises a Type field 601 (e.g., from bit 0 to bit X−1, where 'X' is an integer) and a Data field 602 (e.g., from bit 'X' to X+Y−1, where 'Y' is an integer). In some embodiments, Type field 601 is an address that indicates the type of Destination Circuit. For example, Type field 601 indicates a type of I/O circuit which is being compensated for a parameter (e.g., termination resistance). In some embodiments, Data field 602 (e.g., digital sensor data) provides the compensation code for the circuit.

Referring back to FIG. 1, while various embodiments are described with reference to the IOSF sideband protocol, other messaging protocols may be used. At a very high level, the IOSF sideband protocol delivers a message with several fields. Included in the message are the source and destination port identifiers (ID's), address, and payload. In some embodiments, the endpoints listen to incoming messages and match the destination port ID to determine whether it is the recipient of the message. In some embodiments, the address is then used to write to a predetermined location where the PVT data is expected to be stored.

In some embodiments, PVT Bus Endpoint (e.g., 103-2b) sends a message to the Router/Sensor Hub (e.g., 102-2) with an address and payload that request PVT data. In some embodiments, the Router/Sensor Hub (e.g., 102-2) can then respond back with a message that contains that PVT data. IOSF sideband also supports broadcast messages so general PVT data can be distributed to multiple PVT Bus Endpoints (e.g., 103-2*). The IOSF sideband protocol can be used to delivery messages through several methods.

For example, in some embodiments, the Router/Sensor Hub (e.g., 102-2) sends PVT data through messages with predetermined source ID's registered with the Router/Sensor Hub with the addresses or payload used to determine the PVT data type. In another example, Router/Sensor Hub (e.g., 102-2) broadcasts messages containing PVT data. In yet another example, some or all destinations with the same broadcast ID receives the data. In some embodiments, PVT Bus Endpoints (e.g., 103-2*) may also request specific PVT data by sending a message with the payload specifying the requested sensor/PVT data type. In some embodiments, Router/Sensor Hub (e.g., 102-2) returns the data with another message containing the status and type of data in the payload.

Figure 2:
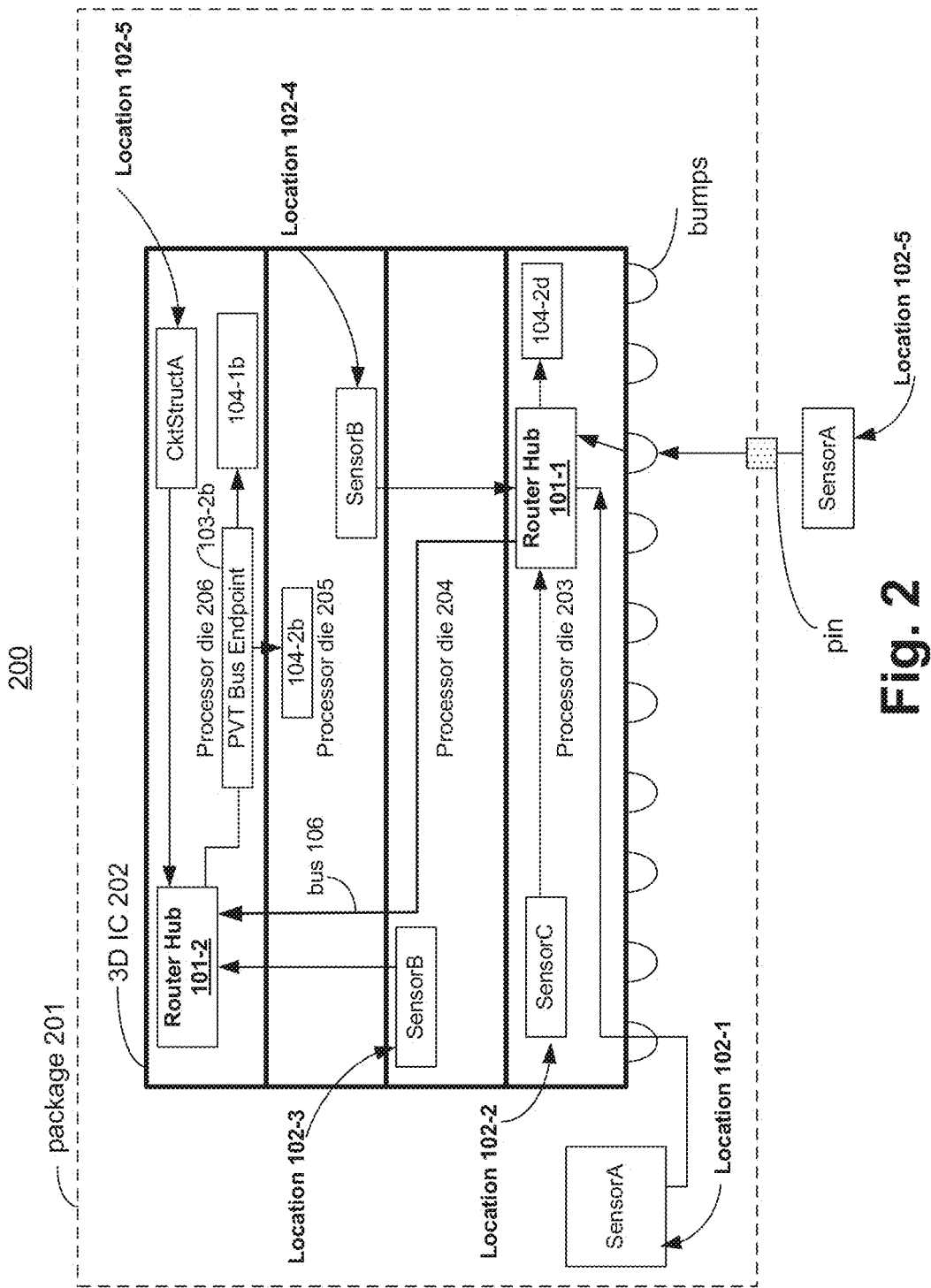
FIG. 2 illustrates a converged compensation scheme in a three dimensional (3D) integrated circuit (IC), according to some embodiments of the disclosure.

FIG. 2 illustrates a converged compensation scheme 200 in a three dimensional (3D) integrated circuit (IC), according to some embodiments of the disclosure. It is pointed out that those elements of FIG. 2 having the same reference numbers (or names) as the elements of any other figure can operate or function in any manner similar to that described, but are not limited to such.

Converged compensation scheme 200 comprises package 201 and 3D IC 202 having the building blocks for converged compensation scheme 200. So as not to obscure the embodiments, the building blocks for converged compensation scheme 200 described before are not described in detail again. In some embodiments, 3D IC 202 comprises a plurality of dies stacked on top of one another such that the sensors, routers, PVT Bus Endpoints, and Distribution Circuits are distributed in different dies.

In this example embodiment, four dies are shown—Processor die 203, 204, 205, and 206. In other embodiments, other number of dies can be stacked together to form a 3D IC. The processor dies may be different types or the same types of dies. For example, Processor die 203 may be a traditional processor core, Processor die 204 may be another traditional processor core, Processor dies 204 and 206 may be memories (e.g., Dynamic Random Access Memories (DRAMs)).

In some embodiments, sensors reside outside package 201 and communicate with a router via package pins and 3D IC bumps. For example, SensorA at Location 102-5 may be an off-die precision reference resistor to provide reference voltage to Router Hub 101-1 via a package pin and a 3D IC bump. In some embodiments, sensors can be located off-die but within the package. For example, SensorA at Location 102-1 may be a diode located within package 201 and communicates with Router Hub 101-1 via the 3D IC bump(s).

In some embodiments, sensors are distributed within processor dies according to the compensation needs of the Destination Circuits. For example, SensorC is located at Location 102-2 and is positioned in Processor die 203; one SensorB is located at Location 102-3 and is positioned in Processor die 204; and another SensorB is located at Location 102-4 and is positioned in Processor die 205.

In some embodiments, the routers may also be located in different dies. For example, Router/Sensor Hub 101-1 is located in Processor die 203 and Router/Sensor Hub 101-2 is located in Processor die 206. The PVT Bus Endpoints may be coupled to the routers to provide encoded PVT data packet(s) (e.g., packet 600) to Destination Circuit(s). For example, PVT Bus Endpoint 103-2b is coupled to Router/Sensor Hub 101-2 to provide encoded PVT data packets to Destination Circuits 104-1b in Processor die 206 and 104-2b in Processor die 205.

Figure 3:
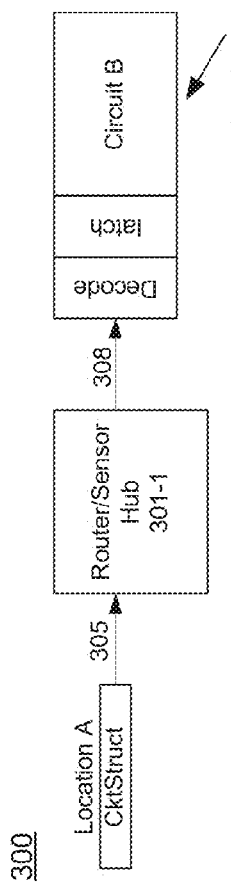
FIG. 3 illustrates a converged compensation scheme using local routers, according to some embodiments of the disclosure.

FIG. 3 illustrates a converged compensation scheme 300 using local routers, according to some embodiments of the disclosure. It is pointed out that those elements of FIG. 3 having the same reference numbers (or names) as the elements of any other figure can operate or function in any manner similar to that described, but are not limited to such.

In some embodiments, the routers (e.g., 101-*), PVT Bus Endpoint (103-*), and PVT data bus (108-*) may be implemented in numerous ways. For example, a global router can be used for multiple blocks in a System-on-Chip (SoC) to distribute PVT data. In another example, a specialized local bus can send PVT data to trim a specific circuit. In some embodiments, the PVT data bus may contain performance data for a large number of circuit structures and devices or a more focused set of data.

In some embodiments, it may be beneficial to implement the adaptive PVT scheme locally such that converged compensation scheme 300 comprises a local sensor or circuit structure (CktStruct) at Location A providing digital data over bus 305 to a local Router/Sensor Hub 301-1 which provides encoded data packet over PVT data bus to Destination Circuit 304. Here, Destination Circuit 304 may be any circuit that prefers local sensors. In this example, Destination Circuit 304 comprises a Decoder, Latch, and analog Circuit B.

One advantage of converged compensation scheme 300 is that it can speed adoption of this scheme to existing compensation scheme, while maintaining reuse of existing circuits. Another reason for implementing converged compensation scheme 300 is to take advantage of the adaptive PVT scheme, but on a smaller scale such as the PHY (Physical) level.

Figure 4:
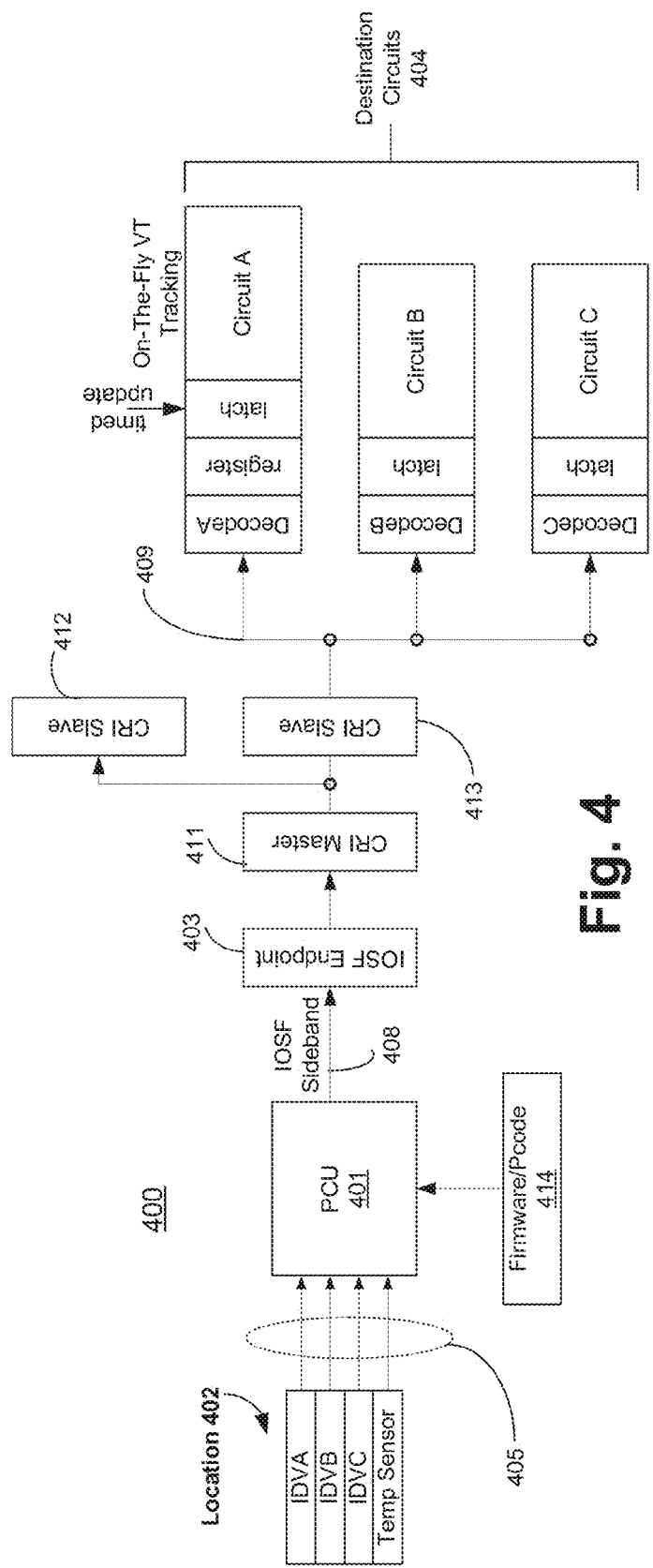
FIG. 4 illustrates a converged compensation scheme using a power control unit or microcontroller, according to some embodiments of the disclosure.

FIG. 4 illustrates a converged compensation scheme 400 using a power control unit (PCU) or microcontroller, according to some embodiments of the disclosure. It is pointed out that those elements of FIG. 4 having the same reference numbers (or names) as the elements of any other figure can operate or function in any manner similar to that described, but are not limited to such.

In some embodiments, converged compensation scheme 400 comprises PCU 401, sensors and circuits at Location 402, PVT Endpoint 403 (e.g., IOSF Endpoint), Destination Circuit(s) 404, Master and Slave register interfaces 411, 412, and 413, respectively, PVT code distribution interconnect 409, and Firmware (e.g., Intel PCU firmware generally referred as Pcode) 414. The architecture of converged compensation scheme 400 is similar to converged compensation scheme 100 but for using existing microcontrollers such as PCU 401 to provide central routing of sensor data to various Destination Circuits. Firmware 414 may function similar to Configuration or Firmware 110 described with reference to FIG. 1.

Referring back to FIG. 4, in this example, the multiple IDV sensors (e.g., IDVA, IDVB, and IDVC) and temperature sensor (i.e., Temp Sensor) are connected to PCU 401 via individual or arbitrated digital sensor bus 405. In some embodiments, PCU 401 functions as the sensor hub. In some embodiments, PCU 401 communicates with PVT Endpoint 403 via IOSF Sideband 408. In some embodiments, PVT Endpoint 403 is a PHY-I Sideband Endpoint which is implemented inside the target PHY (Physical Layer).

In some embodiments, to communicate with the various FUBs (functional unit blocks) within the PHY, CRI (Configuration Register Interface) Master 411 communicates to at least one CRI Slave (e.g., 412 and/or 413) per FUB. In some embodiments, the CRI Slave implements configuration registers where the PVT data is stored. In some embodiments, the circuits and their corresponding decoders of Destination Circuits 404 access the PVT data through these CRI Slave registers.

FIG. 5 illustrates a flowchart 500 of a method for compensating circuits using the converged compensation scheme, according to some embodiments. It is pointed out that those elements of FIG. 5 having the same reference numbers (or names) as the elements of any other figure can operate or function in any manner similar to that described, but are not limited to such.

Although the blocks in the flowchart with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 501, outputs from sensors (e.g., SensorA, SensorB, CktStructA, and CktStructB) in various locations (e.g., Location 102-1, 102-2, 102-3, 102-4, etc.) are read. At block 502, outputs of the sensors are converted to digital codes. For example, sensor outputs are converted to digital code by Analog to Digital Converter (ADCs) and sent over digital bus(s) (e.g., individual or arbitrated digital sensor bus 105-1, 105-2, 105-3, etc.) to one or more routers (e.g., Router/Sensor Hubs 101-1, 101-2, etc.).

At block 503, the digital codes from the sensors are encoded for various Destination Circuits. For example, Router/Sensor Hubs 101-1, 101-2, etc. encode digital codes from the sensors for use in Destination Circuits. In some embodiments, Router/Sensor Hubs 101-1, 101-2, etc. encode the digital codes with information about how and what to compensate the circuits in the Destination Circuits 104-*. The encoding can be any type that is optimal for use of the downstream circuits. The encoder may be abstract since it depends on the type of sensor data that is available and the type of downstream circuits that are being serviced.

At block 504, the routers transport the encoded digital codes as packets to PVT Endpoints 103-* or directly to the Destination Circuits 104-* where the digital codes are decoded. One example of the transported packet is shown with reference to FIG. 6. Any type of known or proprietary messaging scheme can be used for transporting the packets to the PVT Endpoints or directly to the Destination Circuits. Referring back to FIG. 5, at block 505, the packets received by the Destination Circuits 104-* are decoded, latched, and then applied to the circuit to compensate the circuit for one or more parameters. For example, the decoded packets may contain a code word (i.e., a number of bits combined together) to compensate a termination resistance by turning on or off transistor(s) coupled together in parallel to achieve a desired termination resistance or impedance.

The adaptive PVT circuit compensation architecture 100 and/or 200 described in some embodiments is not SoC specific architecture. In some embodiments, the PVT circuit compensation architecture is a universal compensation technique that can also be used for memory devices. Memory technologies today use circuit specific compensation mechanisms. In some embodiments, the existing mechanisms can be replaced by the adaptive compensation scheme in order to reduce on-die costs of implementing replica circuits.

For example, LP-DDR4 (Low Power Double Data Rate 4) memory as defined by JEDEC Document No. JESD209-4 of Aug. 2014 (see, http://www.jedec.org/standards-documents/results/LPDDR4) employs several compensation schemes that can be consolidated and optimized for power and area using the PVT circuit compensation architecture described with reference to several embodiments. In some embodiments, the converged adaptive compensation architecture (e.g., 100, 200, 400, etc.) may periodically retrain write buffers in the LP-DDR4 interface using driver impedance calibration (also referred to as ZQCal which is similar to a typical resistor or termination compensation scheme) used by a memory host PHY. The periodic retraining scheme is used to cancel the differential time drift associated with the unmatched data signal (DQ) and strobe signal (DQS) receive path circuits. In some embodiments, replica circuits are used as sensors in one or more locations for both the strobe distribution tree for the unmatched receiver retraining and for the buffer calibration.

The adaptive compensation scheme of some embodiments does not require addition of pins to the memory devices as compared to existing memory technologies. A compensation scheme that is similar to LP-DDR4 periodic write retraining can be used as a protocol for communication between the SoC and the memory.

Figure 7:
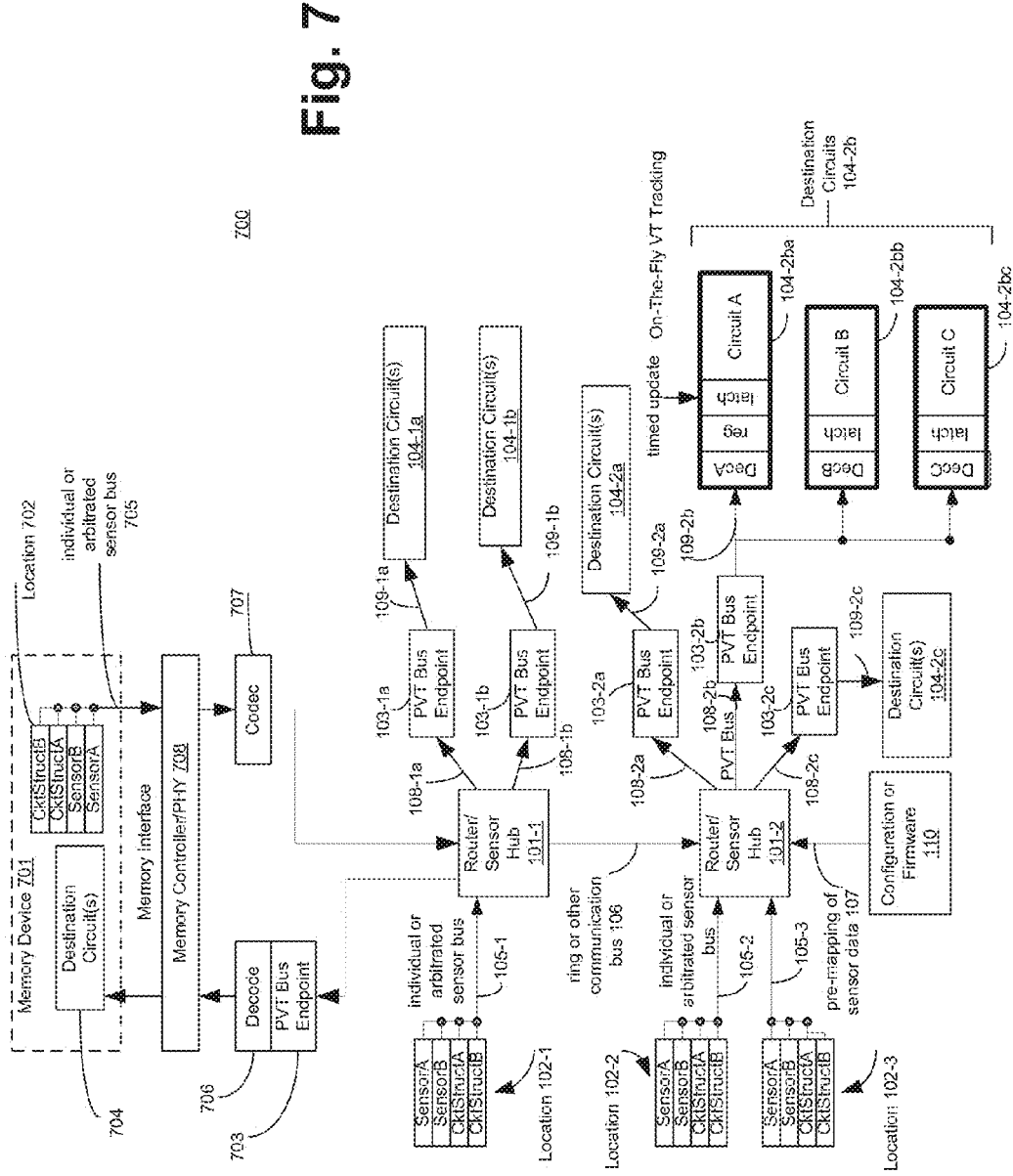
FIG. 7 illustrates a converged compensation scheme with distributed routers, according to some embodiments of the disclosure.

FIG. 7 illustrates a converged compensation scheme 700 with distributed routers, according to some embodiments of the disclosure. It is pointed out that those elements of FIG. 7 having the same reference numbers (or names) as the elements of any other figure can operate or function in any manner similar to that described, but are not limited to such. So as not to obscure the embodiments, differences between FIG. 1 and FIG. 7 are described.

Here, converged compensation scheme 700 is adapted to operate with existing memory devices. FIG. 7 shows Memory Device 701 having Sensors at Location 702 and Destination Circuit(s) 704. The Sensors at Location 702 may be proximate to the Destination Circuits 704. In some embodiments, the output of the sensors is provided to Router/Sensor Hub 101-1 via Memory Interface (e.g., individual or arbitrated sensor bus 705), Memory Controller/PHY 708, and Codec (coder-decoder) 707. In some embodiments, other means may be employed to provide output of sensors to Router/Sensor Hub 101-1.

As described with reference to FIG. 1, Router/Sensor Hub 101-1 processes the sensor data and provides it to PVT Bus Endpoints. In some embodiments, Router/Sensor Hub 101-1 provides compensation data via PVT bus to PVT Bus Endpoint 703. In some embodiments, the compensation data (or PVT data) from Router/Sensor Hub 101-1 is decoded by Decode (decoder) 706 and provided to Destination Circuit(s) 704 via Memory Controller/PHY 708 and Memory Interface.

Figure 8A:
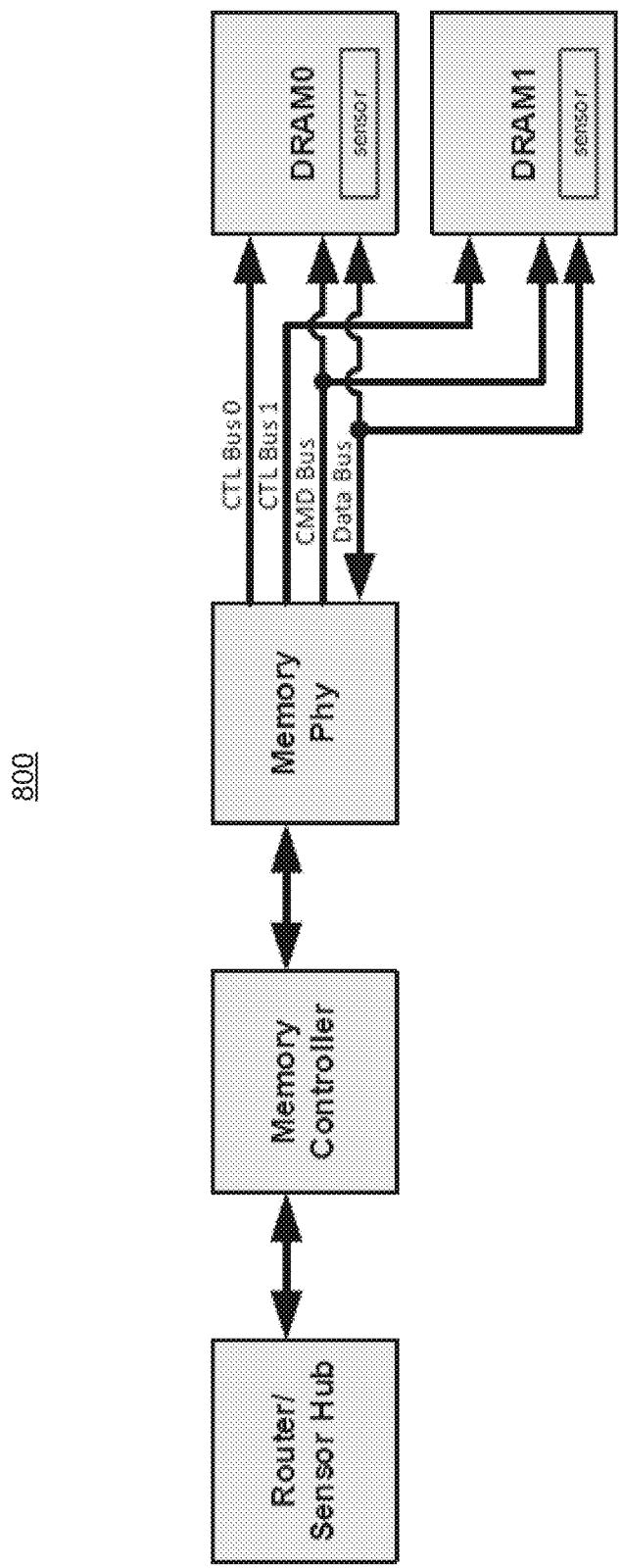
FIG. 8A illustrates a simplified converged compensation scheme for a memory device, according to some embodiments of the disclosure.

FIG. 8A illustrates a simplified converged compensation scheme 800 for a memory device, according to some embodiments of the disclosure. It is pointed out that those elements of FIG. 8A having the same reference numbers (or names) as the elements of any other figure can operate or function in any manner similar to that described, but are not limited to such.

In some embodiments, the memory device can be directed to initiate a sensor calibration cycle through a sequence of MPC (memory controller) commands. The memory device can be directed to initiate a sensor calibration cycle through a sequence of control status register (CSR) commands. In some embodiments, the sensor data can be retrieved by the SoC using MR (memory read) read cycles. In some embodiments, the sensor hub can then process the data and send the calibration settings back to the DRAM through MR write commands. In other embodiments, the sensor hub may send the trim settings to the memory host to compensate the interface according to the memory sensor data. Having the calibration and processing logic inside the Host/SoC serves to keep the complexity outside of the memory device and helps to keep the memory costs down.

In some embodiments, the Router/Sensor Hub communicates to the DRAM (here, DRAM0 and DRAM1) through the Memory Controller and the Memory PHY. The DRAM may have multiple sensors. The memory configuration specifies a device specific control bus (multi-rank) and common command and data buses. The command (CMD) and control (CTL) buses (e.g., CTL Bus 0 and CTL Bus 1) are used to issue the MPC commands. The Data Bus is used to read the MR contents which contain the sensor feedback data. All interface signals required for this already exist in the interface specification. The circuits to be trimmed or calibrated may reside on either the host or the memory device. In the case that the target circuit resides on the host, the host is compensating for memory PVT variation, according to some embodiments.

FIG. 8B illustrates a state machine 820 of a calibration cycle initiated by a host for targeting memory devices, according to some embodiments of the disclosure. It is pointed out that those elements of FIG. 8B having the same reference numbers (or names) as the elements of any other figure can operate or function in any manner similar to that described, but are not limited to such.

From idle state, in some embodiments, the MPC starts to sense data (i.e., MPC Start Sensor) from a sensor and after sensing that data MPC may disable the MPC sensor (i.e., MPC Stop Sensor). The sensed data for that sensor is then read using MR Read command. This process is repeated for all sensors in the memory device. When data from all sensors is read, the Router/Sensor Hub begins to process the sensor data. For example, Router/Sensor Hub uses a Lookup table (LUT) to determine which circuits can use the sensor data for calibrating those circuits. In some embodiments, Router/Sensor Hub calculates/computes/determines the compensation data for the relevant circuits.

Depending on what type of circuit is being trimmed or compensated, trim codes are provided to the relevant circuit. For example, if the relevant circuit (i.e., the destination circuit) is in the memory itself (as shown in FIG. 7) then MPC commands can be used to provide the trim codes to those relevant circuits. In another example, if the relevant circuit (i.e., the destination circuit) is in the Host then CSR for the host can be used to provide the trim settings. Once all relevant circuits are provided their corresponding compensation codes (or trim settings), the compensation process completes (i.e., Done).

Figure 9:
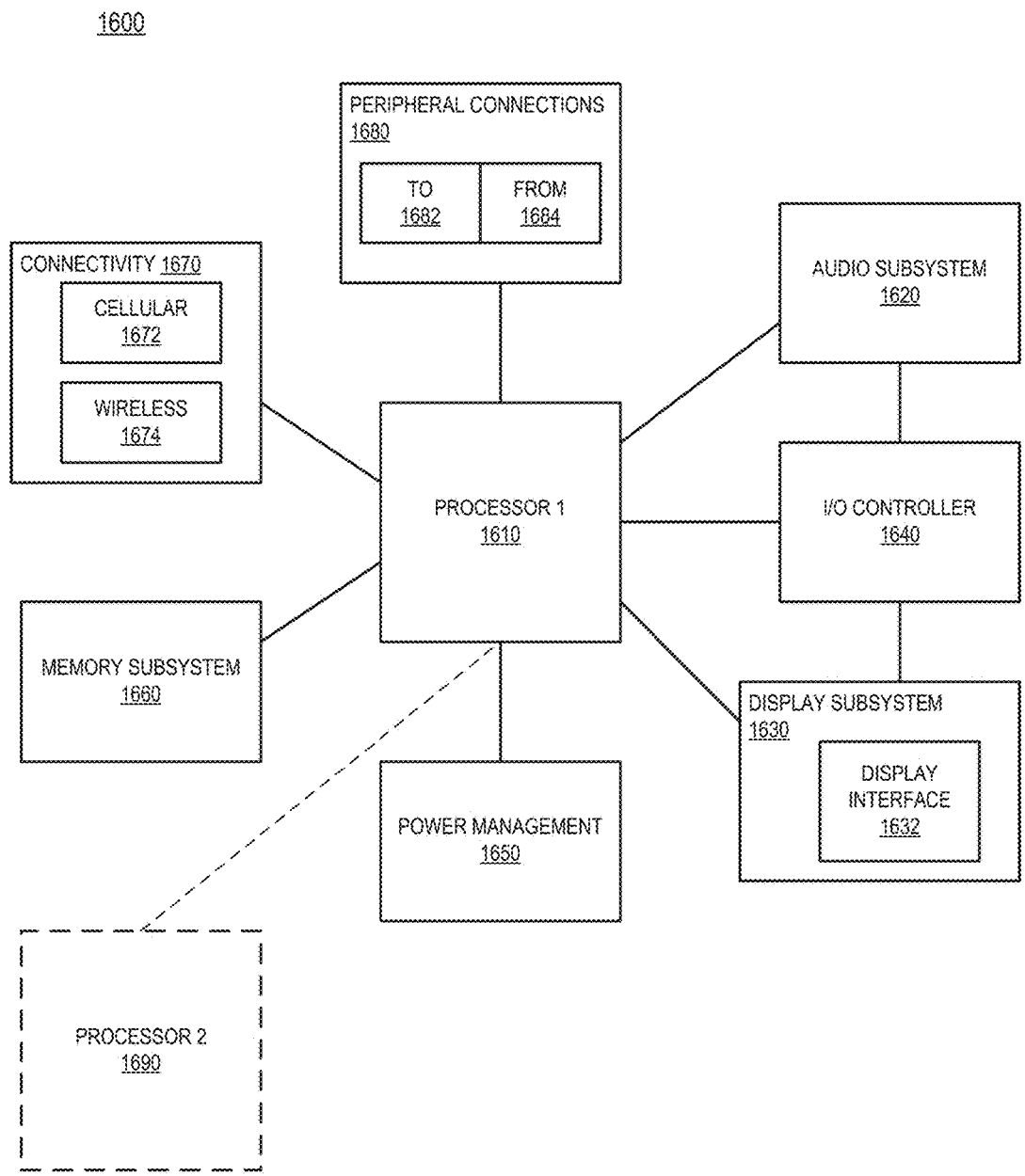
FIG. 9 illustrates a smart device or a computer system or a SoC (System-on-Chip) with a converged compensation scheme, according to some embodiments of the disclosure.

FIG. 9 illustrates a smart device or a computer system or a SoC with a converged compensation scheme, according to some embodiments of the disclosure. It is pointed out that those elements of FIG. 9 having the same reference numbers (or names) as the elements of any other figure can operate or function in any manner similar to that described, but are not limited to such.

FIG. 9 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with converged compensation scheme, according to some embodiments discussed. Other blocks of the computing device 1600 may also include the converged compensation scheme of some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a plurality of sensors to provide one or more digital sensing signals; one or more routing logics coupled to the plurality of sensors, the one or more routing logics to receive the one or more digital sensing signals and to generate packets of data; and one or more communication interfaces, coupled to the one or more routing logics, for providing the packets of data to one or more destinations. In some embodiments, the plurality of sensors include: voltage sensors; temperature sensors; and process sensors. In some embodiments, the apparatus comprises logic to convert output of at least one sensor, of the plurality of sensors, to a digital sensing signal. In some embodiments, the plurality of sensors is positioned at various locations of one or more dies in a three dimensional or a two dimensional integrated circuit.

In some embodiments, the one or more routing logics include: an encoder to encode the one or more digital sensing signals to generate packets of data. In some embodiments, the apparatus comprises firmware to program the encoder of the one or more routing logics. In some embodiments, the one or more routing logics to periodically transmit the packets of data over the one or more communication interfaces to the one or more destinations.

In some embodiments, the one or more routing logics transmit the packets of data over the one or more communication interfaces to the one or more destinations according to types of the one or more destinations. In some embodiments, at least one of the one or more destinations includes a decoder to decode the packets of data. In some embodiments, the one or more destinations include circuits which are to be compensated for a parameter according to the packets of data. In some embodiments, the plurality of sensors includes on-die and off-die sensors or circuits.

In another example, a system is provided which comprises: a memory; a processor coupled to the memory, the processor including: a plurality of sensors to provide one or more digital sensing signals; one or more routing logics coupled to the plurality of sensors, the one or more routing logics to receive the one or more digital sensing signals and to generate packets of data; and one or more communication interfaces, coupled to the one or more routing logics, for providing the packets of data to one or more destinations; and a wireless interface for allowing the processor to couple to another device.

In some embodiments, the system further comprises a display interface for allowing a display unit to display content processed by the processor. In some embodiments, the plurality of sensors is positioned at various locations of the processor which is arranged as a three dimensional integrated circuit. In some embodiments, the processor includes apparatus according to the apparatus described above.

In another example, an apparatus is provided which comprises: a plurality of sensors to provide digital sensing signals; a routing logic coupled to the plurality of sensors, the routing logic to encode the digital sensing signals to generate a packet of data; and a circuit to receive the packet of data and to compensate itself for a parameter according to the packet of data. In some embodiments, the apparatus comprises: a communication interface, coupled to the routing logic, for providing the packet of data to the circuit.

In some embodiments, the plurality of sensors include: voltage sensors; temperature sensors; and process sensors. In some embodiments, the apparatus comprises firmware which is operable to program the encoder. In some embodiments, the routing logic is operable to periodically transmit the packet of data to the circuit. In some embodiments, the plurality of sensors includes on-die and off-die sensors or circuits.

In another example, a system is provided which comprises: a memory; a processor coupled to the memory, the processor including an apparatus according to the apparatus described above; and a wireless interface for allowing the processor to couple to another device. In some embodiments, the system further comprises a display interface for allowing a display unit to display content processed by the processor.

In another example, a method is provided which comprises: providing one or more digital sensing signals from a plurality of sensors; receiving the one or more digital sensing signals; generating packets of data using the one or more digital sensing signals; and providing the packets of data to one or more destinations. In some embodiments, the plurality of sensors include: voltage sensors; temperature sensors; and process sensors.

In some embodiments, the method comprises converting output of at least one sensor, of the plurality of sensors, to a digital sensing signal. In some embodiments, the method comprises positioning the plurality of sensors at various locations of one or more dies in a three dimensional or a two dimensional integrated circuit. In some embodiments, the method comprises encoding the one or more digital sensing signals to generate packets of data. In some embodiments, the method comprises programming the encoder of the one or more routing logics. In some embodiments, the method comprises periodically transmitting the packets of data to the one or more destinations. In some embodiments, the method comprises transmitting the packets of data to the one or more destinations according to types of the one or more destinations. In some embodiments, the method comprises decoding the packets of data at the one or more destinations. In some embodiments, the method comprises compensating a circuit in the one or more destinations for a parameter according to the packets of data. In some embodiments, the plurality of sensors includes on-die and off-die sensors or circuits.

In another example, an apparatus is provided which comprises: means for providing one or more digital sensing signals from a plurality of sensors; means for receiving the one or more digital sensing signals; means for generating packets of data using the one or more digital sensing signals; and means for providing the packets of data to one or more destinations. In some embodiments, the plurality of sensors includes: voltage sensors; temperature sensors; and process sensors. In some embodiments, the apparatus comprises means for converting output of at least one sensor, of the plurality of sensors, to a digital sensing signal. In some embodiments, the apparatus comprises means for positioning the plurality of sensors at various locations of one or more dies in a three dimensional or a two dimensional integrated circuit. In some embodiments, the apparatus comprises means for encoding the one or more digital sensing signals to generate packets of data.

In some embodiments, the apparatus comprises means for programming the encoder of the one or more routing logics. In some embodiments, the apparatus comprises means for periodically transmitting the packets of data to the one or more destinations. In some embodiments, the apparatus comprises means for transmitting the packets of data to the one or more destinations according to types of the one or more destinations. In some embodiments, the apparatus comprises means for decoding the packets of data at the one or more destinations. In some embodiments, the apparatus comprises means for compensating a circuit in the one or more destinations for a parameter according to the packets of data. In some embodiments, the apparatus the plurality of sensors include on-die and off-die sensors or circuits.

In another example, a system is provided which comprises: a memory; a processor coupled to the memory, the processor including an apparatus according to the apparatus described above; and a wireless interface for allowing the processor to couple to another device. In some embodiments, the system further comprises a display interface for allowing a display unit to display content processed by the processor.

In another example, an apparatus is provided which comprises: logic to convert output of at least one sensor to a digital sensing signal; a router coupled to the sensor, the router to receive the digital sensing signal and to map into circuit data; and one or more communication interfaces, coupled to the router, to forward the circuit data to a circuit endpoint. In another embodiment, the at least one sensor is one of: voltage sensor; temperature sensor; or process sensor. In another embodiment, the logic to comprises an analog to digital converter to convert the output of the at least one sensor to the digital sensing signal. In another embodiment, the at least one sensor is positioned in one of a multiple of dies in a three dimensional integrated circuit.

In another embodiment, the router includes: an encoder to encode the digital sensing signal to generate the circuit data as packets of data. In another embodiment, at least one of the packets of data includes a type field to indicate a type of the circuit endpoint, and a data field to provide a compensation code for the circuit endpoint. In another embodiment, the apparatus comprises firmware to program the encoder. In another embodiment, the router to periodically transmit the packets of data over the one or more communication interfaces to the circuit endpoint. In another embodiment, the router to transmit the packets of data over the one or more communication interfaces to the circuit endpoint according to the type of the circuit endpoint.

In another embodiment, the circuit endpoint includes a decoder to decode the packets of data. In another embodiment, the circuit endpoint includes one or more circuits which are to be compensated for a parameter according to the packets of data. In another embodiment, the at least one sensor is either positioned on-die or off-die.

In another example, a system is provided which comprises: a memory; a processor coupled to the memory, the processor including an apparatus according to the apparatus described above; and a wireless interface for allowing the processor to couple to another device. In some embodiments, the system further comprises a display interface for allowing a display unit to display content processed by the processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A packaged processor chip comprising:
   logic to convert output of at least one sensor to a digital sensing signal;
   a router coupled to the sensor, the router to receive the digital sensing signal and to map into circuit data, wherein the circuit data is configured as packets of data, and wherein at least one packet of data includes a type field to indicate a type of circuit endpoint; and
   one or more communication interfaces, coupled to the router, to forward the circuit data to the circuit endpoint, wherein the logic, router and one or more communication interfaces are within the packaged processor chip; and
   wherein at least one of the packets of data includes a data field to provide a code for the circuit endpoint; and
   wherein the circuit endpoint includes one or more circuits which are to be compensated for a parameter, according to the packets of data.

2. The packaged processor chip of claim 1, wherein the at least one sensor is one of:
   voltage sensor;
   temperature sensor; or
   process sensor.

3. The packaged processor chip of claim 1, wherein the logic comprises an analog to digital converter to convert the output of the at least one sensor to the digital sensing signal.

4. The packaged processor chip of claim 1, wherein the at least one sensor is positioned in one of a multiple of dies in a three dimensional integrated circuit.

5. The packaged processor chip of claim 1, wherein the router includes:
   an encoder to encode the digital sensing signal to generate the circuit data as the packets of data.

6. The packaged processor chip of claim 1, wherein the code is a compensation code for the circuit endpoint.

7. The packaged processor chip of claim 5 comprises firmware to program the encoder.

8. The packaged processor chip of claim 5, wherein the router is to periodically transmit the packets of data over the one or more communication interfaces to the circuit endpoint.

9. The packaged processor chip of claim 5, wherein the router is to transmit the packets of data over the one or more communication interfaces to the circuit endpoint according to the type of the circuit endpoint.

10. The packaged processor chip of claim 5, wherein the circuit endpoint includes a decoder to decode the packets of data.

11. The packaged processor chip of claim 1, wherein the at least one sensor is either positioned on-die or off-die.

12. The packaged processor chip of claim 1, wherein the circuit endpoint is operable to be to trimmed in real time using data from the sensor.

13. The packaged processor chip of claim 1, wherein the sensor comprises a process measuring structure.

14. The packaged processor chip of claim 13, wherein the process measuring structure comprises a ring oscillator.

15. The packaged processor chip of claim 1, wherein the one or more communication interfaces comply with at least one of: IOSF protocol, AMBA protocol, or CoreConnect protocol.

16. A method comprising:
    providing one or more digital sensing signals from a plurality of sensors;
    receiving the one or more digital sensing signals;
    generating packets of data using the one or more digital sensing signals; and
    providing the packets of data to one or more destinations; and
    compensating a circuit in the one or more destinations for a parameter according to the packets of data.

17. The method of claim 16, wherein the plurality of sensors includes at least one of:
    voltage sensors;
    temperature sensors; or
    process sensors.

18. The method of claim 16 comprises converting output of at least one sensor, of the plurality of sensors, to a digital sensing signal.

19. The method of claim 16 comprises positioning the plurality of sensors at various locations of one or more dies in a three dimensional or a two dimensional integrated circuit.

20. The method of claim 16 comprises encoding the one or more digital sensing signals to generate packets of data.

21. The method of claim 20 comprises programming the encoding operation of one or more routing logics.

22. The method of claim 16 comprises periodically transmitting the packets of data to the one or more destinations.

23. The method of claim 16 comprises transmitting the packets of data to the one or more destinations according to types of the one or more destinations.

24. The method of claim 16 comprises decoding the packets of data at the one or more destinations.

25. The method of claim 16, wherein the plurality of sensors includes on-die and off-die sensors or circuits.

26. A system comprising:
    a memory;
    a processor coupled to the memory, the processor including:
       logic to convert output of at least one sensor to a digital sensing signal;
       a router coupled to the sensor, the router to receive the digital sensing signal and to map into circuit data, wherein the circuit data is configured as packets of data, wherein at least one packet of data includes a type field to indicate a type of a circuit endpoint; and one or more communication interfaces, coupled to the router, to forward circuit data to the circuit endpoint, wherein the processor and memory are within a packaged processor chip, and wherein at least one of the packets of data includes a data field to provide a code for the circuit endpoint, wherein the code is a compensation code for the circuit endpoint; and a wireless interface to allow the processor to couple to another device.

27. The system of claim 26 further comprises a display interface to allow a display unit to display content processed by the processor.

* * * * *